(12) United States Patent
Chen et al.

(10) Patent No.: US 11,577,456 B2
(45) Date of Patent: Feb. 14, 2023

(54) MOLDED PANELS

(71) Applicant: HEWLETT-PACKARD DEVELOPMENT COMPANY, L.P., Spring, TX (US)

(72) Inventors: Chien-Hua Chen, Corvallis, OR (US); Michael W Cumbie, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 565 days.

(21) Appl. No.: 16/495,472

(22) PCT Filed: May 1, 2017

(86) PCT No.: PCT/US2017/030374
§ 371 (c)(1),
(2) Date: Sep. 19, 2019

(87) PCT Pub. No.: WO2018/203872
PCT Pub. Date: Nov. 8, 2018

(65) Prior Publication Data
US 2020/0094475 A1    Mar. 26, 2020

(51) Int. Cl.
| | |
|---|---|
| *B29C 64/209* | (2017.01) |
| *B33Y 30/00* | (2015.01) |
| *B29D 99/00* | (2010.01) |
| *B41J 2/14* | (2006.01) |
| *B41J 2/16* | (2006.01) |

(52) U.S. Cl.
CPC .......... *B29C 64/209* (2017.08); *B29D 99/001* (2013.01); *B33Y 30/00* (2014.12); *B41J 2/1433* (2013.01); *B41J 2/162* (2013.01)

(58) Field of Classification Search
None
See application file for complete search history.

(56) References Cited

U.S. PATENT DOCUMENTS

| | | | |
|---|---|---|---|
| 5,946,012 A | 8/1999 | Courian et al. | |
| 6,331,055 B1 * | 12/2001 | Miller | B41J 2/1433 |
| | | | 347/92 |

(Continued)

FOREIGN PATENT DOCUMENTS

| | | |
|---|---|---|
| CN | 1608853 | 4/2005 |
| CN | 101687350 A | 3/2010 |

(Continued)

OTHER PUBLICATIONS

Alexander, G. Cooper, Fabrication of Ceramic Components Using Mold Shape Deposition Manufacturing, http://npl-web.stanford.edu/user/files/papers/thesis_agcooper.pdf.

*Primary Examiner* — Joseph S Del Sole
*Assistant Examiner* — Guy F Mongelli
(74) *Attorney, Agent, or Firm* — Foley & Lardner LLP (57) ABSTRACT

Examples include a process comprising forming a molded panel that includes a fluid ejection die molded in the molded panel. The molded panel is formed with a mold chase and a release liner. The mold chase has a fluid slot feature that aligns with fluid feed holes of the fluid ejection die. The mold chase and release liner is released from the molded panel such that the molded panel has a fluid slot formed therethrough corresponding to the fluid slot feature of the mold chase, and the fluid slot is fluidly connected to the fluid feed holes of the fluid ejection die.

11 Claims, 6 Drawing Sheets

(56) References Cited

U.S. PATENT DOCUMENTS

| | | |
|---|---|---|
| 6,375,880 B1 | 4/2002 | Cooper et al. |
| 6,443,179 B1 | 9/2002 | Benavides et al. |
| 10,029,484 B2 * | 7/2018 | Pervan ................. B05D 3/067 |
| 2001/0002135 A1 * | 5/2001 | Milligan ................ B41J 2/1404 347/65 |
| 2002/0180825 A1 | 12/2002 | Buswell et al. |
| 2005/0236358 A1 | 10/2005 | Buswell |
| 2006/0114294 A1 | 6/2006 | Kim |
| 2007/0052322 A1 | 3/2007 | Tai et al. |
| 2008/0016689 A1 | 1/2008 | Horn et al. |
| 2016/0023462 A1 | 1/2016 | Chen |
| 2016/0279938 A1 | 9/2016 | Takino et al. |

FOREIGN PATENT DOCUMENTS

| | | | |
|---|---|---|---|
| CN | 101801671 A | 8/2010 | |
| CN | 102548766 A | 7/2012 | |
| CN | 103025530 A | 4/2013 | |
| CN | 105121166 | 12/2015 | |
| CN | 105142915 | 12/2015 | |
| CN | 205270609 U | 6/2016 | |
| CN | 105793044 A | 7/2016 | |
| CN | 205553089 U | 9/2016 | |
| CN | 106068550 A | 11/2016 | |
| CN | 110461612 | 11/2019 | |
| EP | 2961611 | 1/2016 | |
| EP | 2961611 A1 * | 1/2016 | ........... B29C 69/001 |
| JP | 2013226693 | 11/2013 | |
| JP | 2014014928 | 1/2014 | |
| JP | 2015036248 | 2/2015 | |
| JP | 2016511717 | 4/2016 | |
| JP | 2016515952 | 6/2016 | |
| WO | WO-2014133633 A1 * | 9/2014 | ................ B41J 2/14 |
| WO | WO-2015041665 A1 | 3/2015 | |
| WO | WO-2016065056 A1 | 4/2016 | |
| WO | WO-2016137490 A1 | 9/2016 | |
| WO | WO-2017050808 A1 | 3/2017 | |

\* cited by examiner

MOLDED PANELS

BACKGROUND

Microfabrication and micromachining processes may refer to processes in which micrometer scale or smaller devices and structures may be formed. For example, microelectromechanical systems corresponds to various microstructures which may be implemented in sensors or other devices. As another example, microfluidic devices, such as inkjet printheads, may correspond to devices of a micrometer or smaller scale that convey, dispense, and/or process small amounts (e.g., microliters) of fluid substances.

DRAWINGS

Throughout the drawings, identical reference numbers designate similar, but not necessarily identical, elements. The figures are not necessarily to scale, and the size of some parts may be exaggerated to more clearly illustrate the example shown.

DESCRIPTION

Examples of devices may comprise fluid ejection devices, fluidic sensors, lab-on-a-chip (LOC) devices, integrated fluidic processing devices, microelectromechanical systems, and/or other such microfabricated devices. In such examples, a fluidic die (such as a fluid ejection die) may be molded into a panel, where the molded panel may have a fluid slot formed through the panel. The molded panel may be formed with a mold chase into which a mold material may be input. Example mold materials that may be used in examples described herein may comprise an epoxy mold compound, such as CEL400ZHF40WG from Hitachi Chemical, Inc., and/or other such materials. The mold chase may have a fluid slot feature that may align with fluid feed holes of the fluidic die such that a fluid slot may be formed in the molded panel that corresponds to the fluid slot feature of the mold chase. Furthermore, a release liner may be positioned on an interior surface of the mold chase, such that mold material input to the mold chase may contact the release liner during formation of the molded panel with the mold chase. Example release liners may be formed from various materials, such as polyvinyl fluoride films (PTFE) and other similar materials.

In some examples, prior to forming the molded panel, a removable protective layer may be distributed over the fluid feed holes of the fluidic die. In such examples, the protective layer may cover and seal the fluid feed holes such that mold material may not enter the fluid feed holes during formation of the molded panel. Example protective layers may be formed from various materials, such as a plastic-based material (e.g., thermoplastic), a metal based material, an alloy, an acrylic-based material, HT10.10 from Brewer Science, Inc., thermal decomposable polymers from Novomer, Inc., and/or other such materials. In some examples, a height of the protective layer distributed on the fluid ejection die may be within a range of approximately 1 micrometers to approximately 20 micrometers. In some examples, a height of the protective layer distributed on the fluid ejection die may be within a range of approximately 5 micrometers to approximately 10 micrometers. The term "approximately" when used with regard to a value may correspond to a range of ±10%. In some examples, the removable protective layer may be deformable, such that engagement thereof by a portion of the fluid slot feature of the mold chase (and a release liner positioned thereon) may cause deformation of the protective layer. Accordingly, engagement of the protective layer with a portion of the fluid slot feature may further form a seal between the fluid slot feature (and release liner thereon) and the protective layer on the fluidic die such that mold material may not collect therebetween during formation of the molded panel.

In some examples, a fluidic die may be a fluid ejection die, and the fluid ejection die may be molded into a molded panel such that the fluid ejection die and molded panel collectively may be referred to as a fluid ejection device. In these examples, the molded panel may have a fluid slot formed as described above, where the fluid slot is fluidly connected to fluid feed holes of the fluid ejection die. In these examples, fluid may be conveyed through such fluid slot to the fluid feed holes of the fluid ejection die. In some examples, a fluid ejection die may be a printhead, and a fluid ejection device may comprise at least one printhead at least partially embedded in a molded panel having a fluid slot formed therethrough in the manner described herein.

In some examples corresponding to printheads, fluid ejection dies may be generally arranged end-to-end along a width of the molded panel such that a printing device implementing the fluid ejection device may perform a page-wide printing process. In other example fluid ejection devices, a single fluid ejection die may be molded into the molded panel. In some examples, fluid ejection dies may be referred to as slivers. In addition, the fluid ejection dies may be formed with silicon or a silicon-based material. Various features, such as nozzles, may be formed from various materials used in silicon device based fabrication, such as silicon dioxide, silicon nitride, metals, epoxy, polyimide, other carbon-based materials, etc. As described herein, a sliver may correspond to a fluid ejection die having: a thickness of approximately 650 μm or less; exterior dimensions of approximately 30 mm or less; and/or a length to width ratio of approximately 3 to 1 or larger.

Furthermore, some fluid ejection devices, as described herein, may be implemented in printing devices, such as two-dimensional printers and/or three-dimensional printers (3D). In some examples, a fluid ejection device may be implemented into a printing device and may be utilized to print content onto a media, such as paper, a layer of powder-based build material, reactive devices (such as lab-on-a-chip devices), etc. Example fluid ejection devices include ink-based ejection devices, digital titration devices, 3D printing devices, pharmaceutical dispensing devices, lab-on-chip devices, fluidic diagnostic circuits, and/or other such devices in which amounts of fluids may be dispensed/ejected. In some examples, a printing device in which a fluid ejection device may be implemented may print content by deposition of consumable fluids in a layer-wise additive manufacturing process. Generally, consumable fluids and/or consumable materials may include all materials and/or compounds used, including, for example, ink, toner, fluids or powders, or other raw material for printing. Generally, printing material, as described herein may comprise consumable fluids as well as other consumable materials. Printing material may comprise ink, toner, fluids, powders, colorants, varnishes, finishes, gloss enhancers, binders, and/or other such materials that may be utilized in a printing process.

Figure 1:
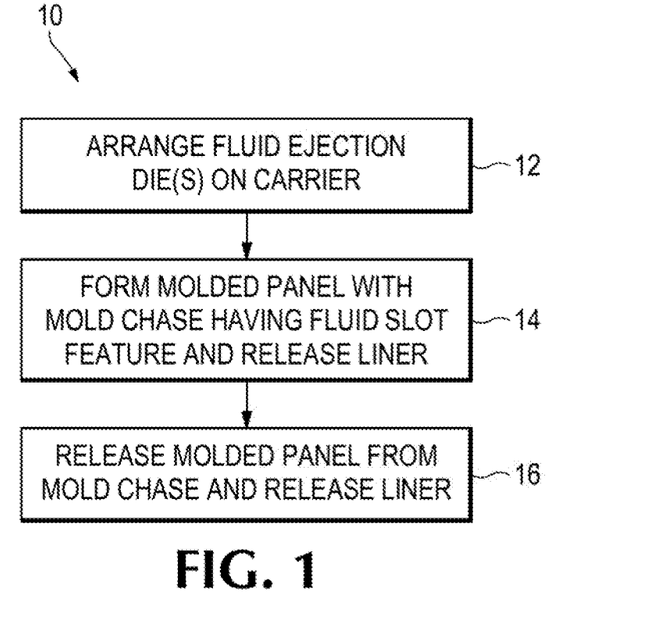
FIG. 1 is a flowchart that illustrates some operations of an example process.

Turning now to the figures, and particularly, to FIG. 1, this figure illustrates some operations of an example process 10. In this example, at least one fluid ejection die may be arranged on a carrier (block 12). A molded panel may be formed with a mold chase having a fluid slot feature and a release liner positioned on an interior surface of the mold chase (block 14). In such examples, the fluid slot feature of the mold chase may be aligned with fluid feed holes of the fluid ejection die. The molded panel may include the at least one fluid ejection die embedded therein such that a top surface of the fluid ejection die may be approximately planar with a top surface of the molded panel. The molded panel may be released from the mold chase and the release liner. Upon release from the mold chase and release liner, the molded panel may have a fluid slot formed therethrough that corresponds to the fluid slot feature of the mold chase. In such examples, the fluid slot of the molded panel may be fluidly connected to fluid feed holes of the fluid ejection die.

Figure 2:
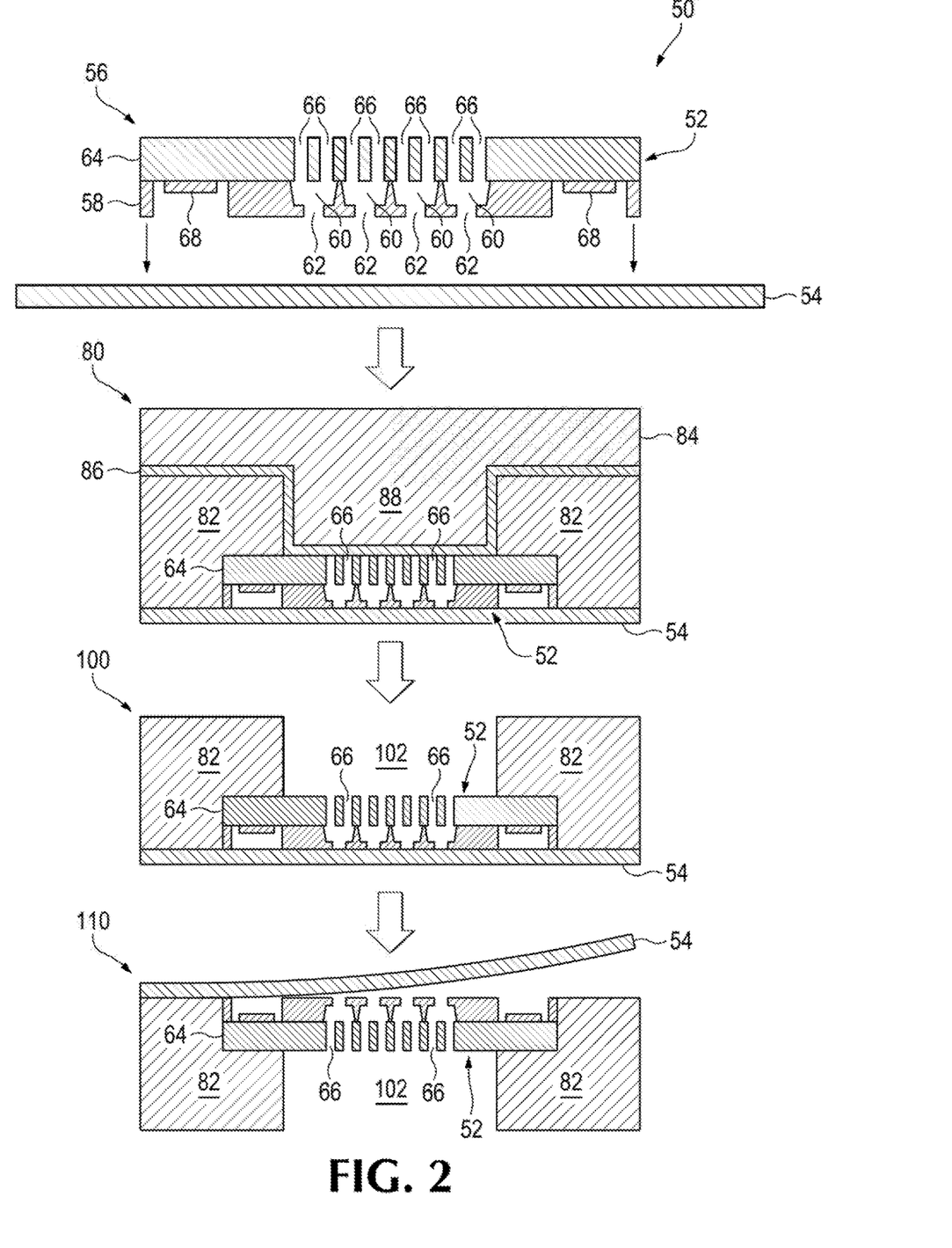
FIG. 2 is a flow diagram of an example process.

FIG. 2 provides a flow diagram that illustrates some operations of an example process 50. In this example, a fluid ejection die 52 may be arranged on a carrier 54 (block 56). In some examples, the carrier 54 may have a temporary adhesive surface such that a top surface 58 of the fluid ejection die 52 may contact and temporarily adhere to the carrier 54. As shown, the fluid ejection die 52 comprises nozzles 60 having nozzle orifices 62 formed in a top surface of the fluid ejection die 52 through which fluid drops may be ejected. On a bottom surface 64, the fluid ejection die 52 includes fluid feed holes 66 formed therethrough and fluidly connected to the nozzles 60 such that fluid may be conveyed from the fluid feed holes to the nozzles for ejection as fluid drops. In addition, the fluid ejection die 52 may comprise at least one electrical contact point 68 through which electrical connections to the fluid ejection die 52 may be facilitated.

At block 80, a molded panel 82 may be formed with a mold chase 84 having a release liner 86 disposed on an interior surface of the mold chase 84 such that the release liner 86 contacts the mold material of the molded panel 82. Furthermore, as shown at block 80, the mold chase 84 includes a fluid slot feature 88 that aligns with the fluid feed holes 66 of the fluid ejection die 52 that is molded into the molded panel 82. As shown in this example, the fluid slot feature of the mold chase 84 and the portion of the release liner 86 disposed thereon may contact the bottom surface 64 of the fluid ejection die during formation of the molded panel 82 and cover the fluid feed holes 66.

At block 100, the molded panel 82 including the fluid ejection die 52 molded (and at least partially embedded) therein may be released from the mold chase 84 and release liner 86 such that a fluid slot 102 may be formed through the molded panel 82. As shown, the fluid slot 102 may be fluidly connected to the fluid feed holes 66 of the fluid ejection die 52. In block 110, the carrier 54 may be released from the molded panel 82 and fluid ejection die. As may be appreciated, a fluid ejection device may be formed by the example process 50 provided in FIG. 2.

Figure 3:
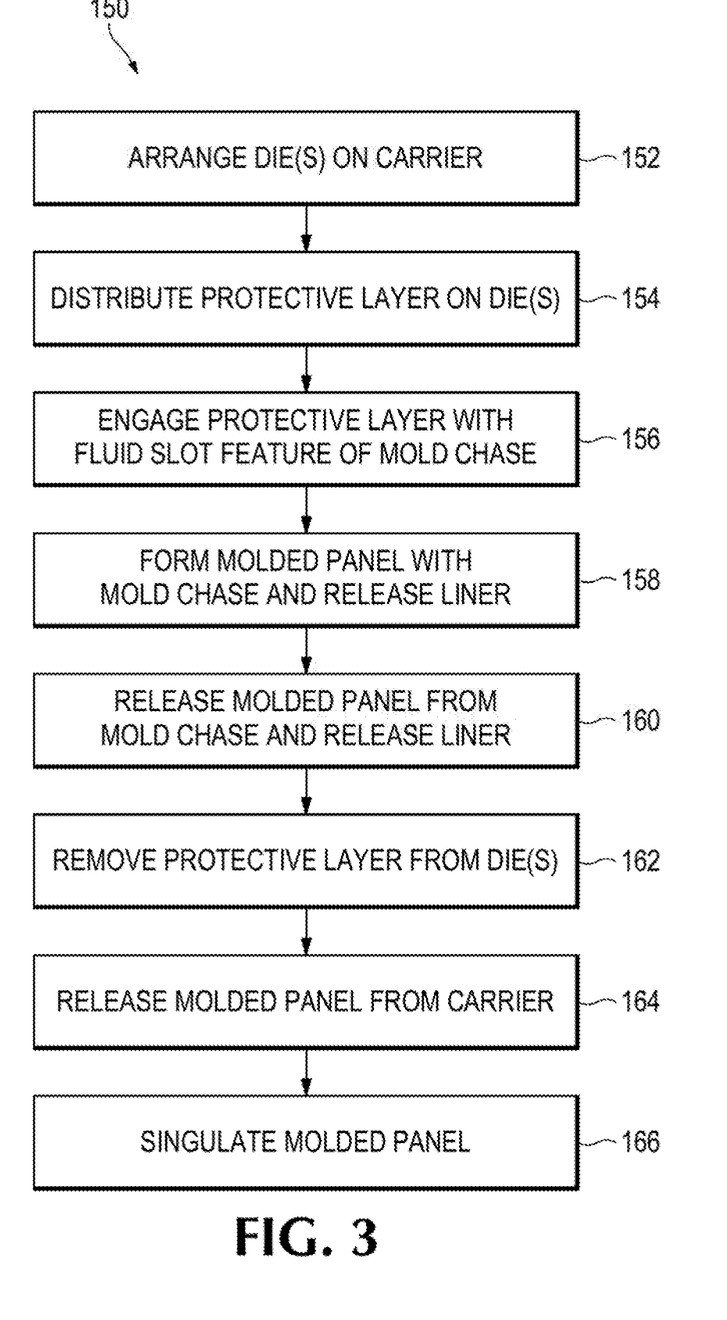
FIG. 3 is a flowchart that illustrates some operations of an example process.

Turning now to FIG. 3, this figure provides a flowchart 150 that illustrates an example sequence of operations that may be performed by an example process. In this example, fluid ejection dies may be arranged on a carrier (block 152). In such examples, the carrier may temporality couple with a top surface of the fluid ejection dies in which nozzle orifices may be formed. On a bottom surface of the fluid ejection dies, in which fluid feed holes may be formed, a protective layer may be distributed thereon (block 154), where the protective layer may cover and seal the fluid feed holes.

The carrier including the fluid ejection dies may be positioned proximate a mold chase such that a molded panel may be formed with the mold chase and mold material. In such examples, the mold chase may have a fluid slot feature that may facilitate formation of at least one fluid slot for each fluid ejection die to be molded into the molded panel. Furthermore, as described previously, a release liner may be coupled to an interior surface of the mold chase, such that mold material to be formed into the molded panel may contact the release liner. The protective layer distributed on the bottom surface of each fluid ejection die may be engaged by a portion of the release liner that covers the fluid slot feature of the mold chase corresponding to the fluid ejection die (block 156). By engaging the protective layer of each fluid ejection die with the fluid slot feature corresponding to the fluid ejection die, the protective layer may deform and thereby form a seal over the fluid feed holes.

The molded panel may be formed with the mold chase and release liner (block 158). In some examples, the molded panel may be formed by transfer molding with the mold chase and release liner. As discussed, the molded panel may include the fluid ejection dies embedded therein such that a top surface of the fluid ejection dies (in which the nozzle orifices may be formed) may be approximately planar with a top surface of the molded panel. The molded panel may be released from the mold chase and release liner. Upon release of the molded panel, a fluid slot may be present in the molded panel that corresponds to the fluid slot feature of the mold chase. Accordingly, the protective layer disposed on the bottom surface of each fluid ejection die may be exposed in each fluid slot. The protective layer may be removed from the bottom surface of each fluid ejection die (block 162) such that the fluid feed holes of each fluid ejection die are fluidly connected to the corresponding fluid feed slot formed through the molded panel. In these examples, the protective layer engaged with the release liner disposed on the fluid slot feature may form a seal such that mold material used in the molded panel formation process may be prevented from entering the fluid feed holes of the fluid ejection dies.

The molded panel that includes the fluid ejection dies molded therein may be released from the carrier (block 164), and the molded panel may be singulated (block 168). In such examples in which a plurality of fluid ejection dies may be molded into the molded panel, the molded panel and fluid ejection dies thereof may be singulated into fluid ejection devices having one fluid ejection die each or fluid ejection devices having a plurality of fluid ejection dies. Singulating the devices may comprise dicing the molded panel, cutting the molded panel, and/or other such known singulation processes.

Figure 4A:
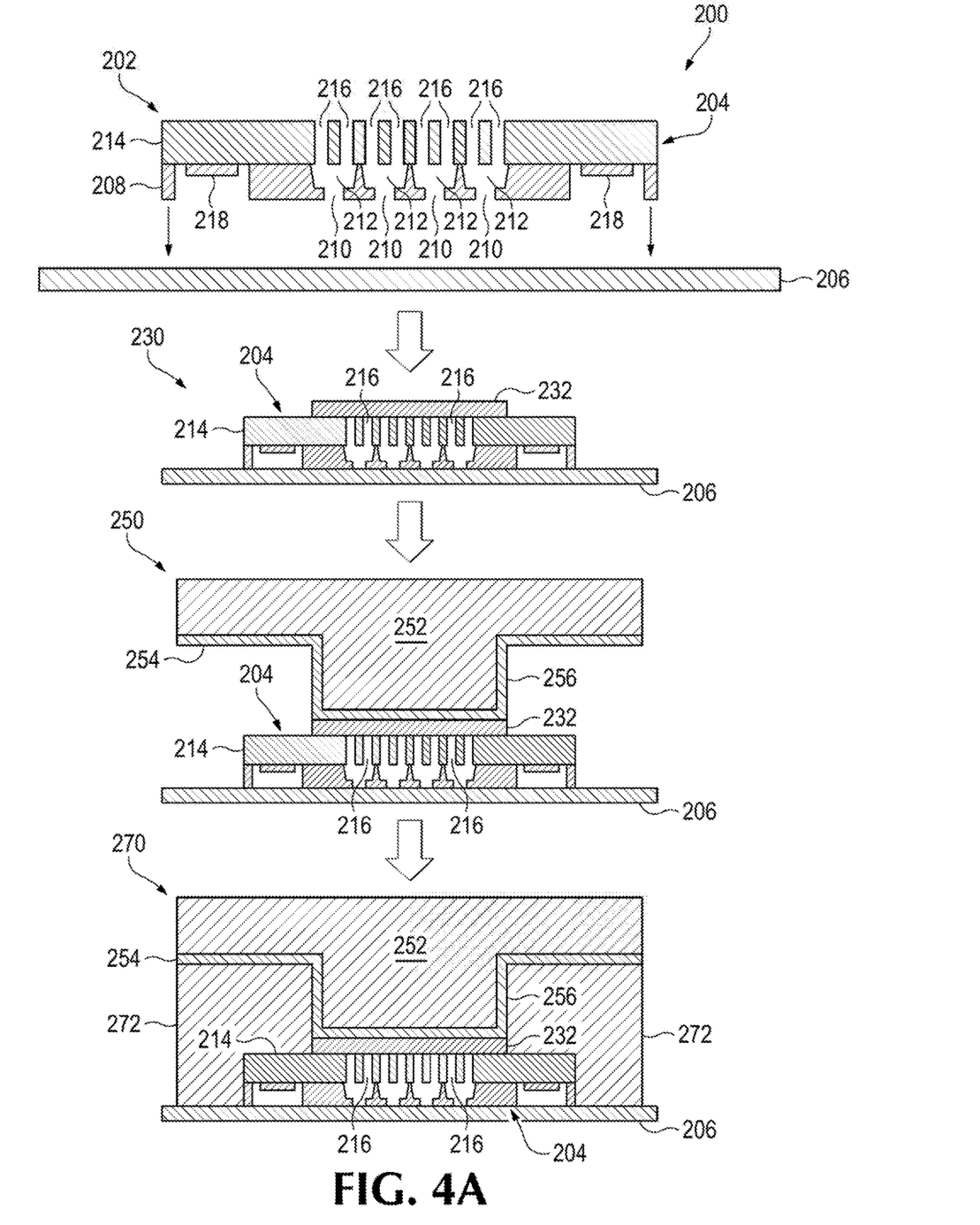
FIGS. 4A-B are flow diagrams of an example process.
Figure 4B:
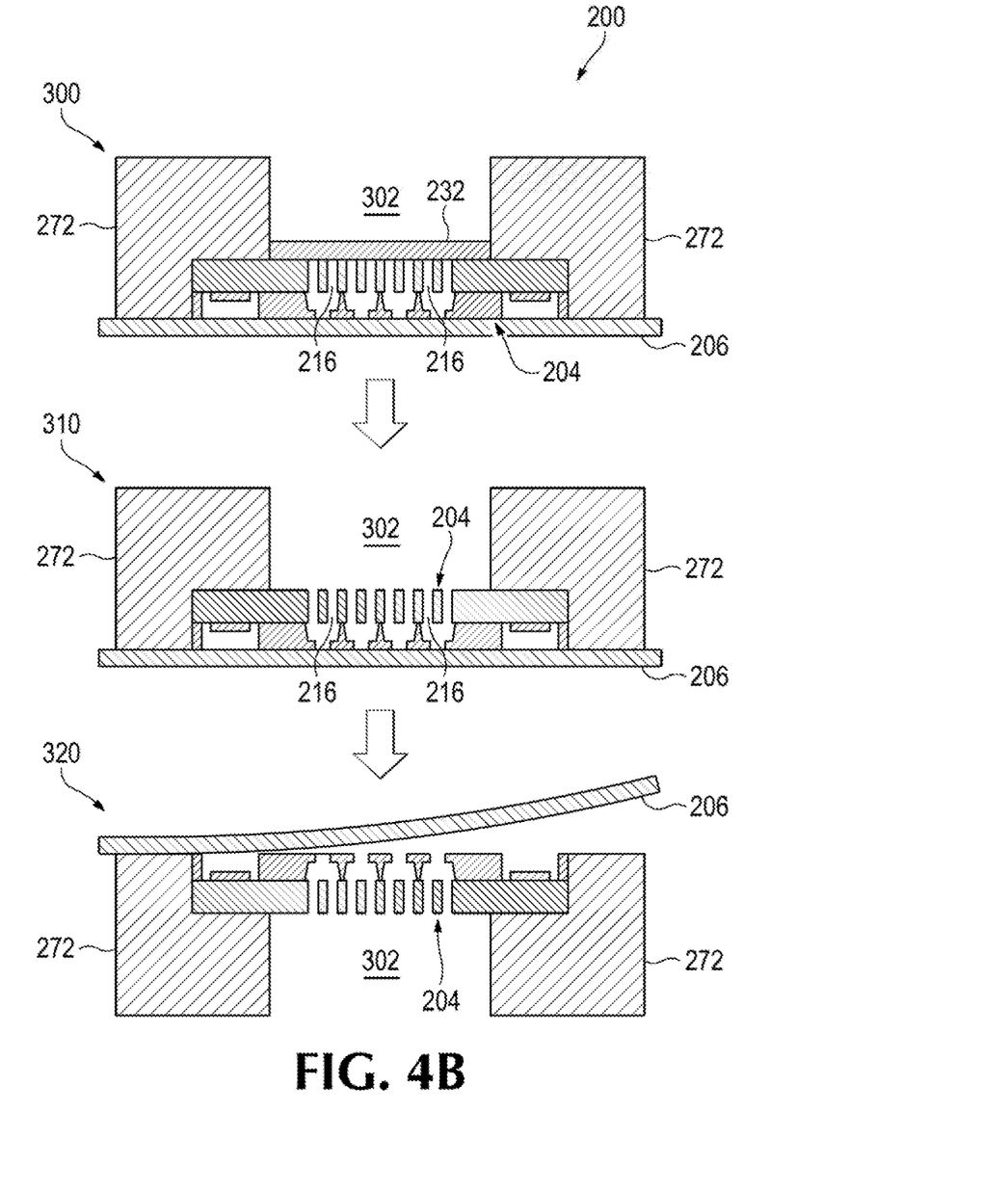

FIGS. 4A-B provide flow diagrams that illustrate some operations of an example process 200. In FIG. 4A, at block 202, a fluid ejection die 204 may be arranged on a carrier 206. As shown, the fluid ejection die 204 may have a first surface 208 (i.e., a top surface) in which nozzle orifices 210 may be formed. The first surface 208 may be placed and removably coupled with the carrier 206. Each nozzle orifice may correspond to and be fluidly connected to a fluid chamber 212 (which may also be referred to as an ejection chamber). While not shown, each fluid chamber 212 may include at least one fluid actuator that may be actuated to cause displacement of fluid in the fluid chamber 212, which, in turn, may cause ejection of a fluid drop via the nozzle orifice 210. On a second surface 214 of the fluid ejection die (i.e., a bottom surface), the fluid teed holes 216 may be formed. Furthermore, the fluid ejection die may comprise electrical contacts 218.

At block 230, a protective layer 232 is distributed on a portion of the second surface 214 of the fluid ejection die 204 such that the protective layer covers the fluid feed holes 216 of the fluid ejection die 204. At block 250, the fluid ejection die and carrier are positioned such that molding of a molded panel may be performed with a mold chase 252 having a release liner 254 disposed on an interior surface thereof. As described in previous examples, the mold chase 252 may have a fluid slot feature 256 that may correspond to a fluid slot to be formed in a molded panel formed therewith. The fluid slot feature 256 may align with the fluid feed holes 216 of the fluid ejection die 204. In this example, the protective layer 232 disposed on the second surface 214 of the fluid ejection die 204 may be engaged by the release liner 254 portion covering the fluid slot feature 256 such that the protective layer may deform and form a seal between the release liner 254 portion and the second surface 214 of the fluid ejection die 204 such that mold material may be prevented from entering the fluid feed holes 216 during formation of the molded panel with the mold material.

At block 270, mold material is formed into a molded panel 272 with the mold chase 252 and release liner 254. As shown, the protective layer 232 is positioned between the release liner 254 portion covering the fluid slot feature and portion of the second surface 214 of the fluid ejection die 204 in which the fluid feed holes 216 are formed. In FIG. 4B, at block 300, the molded panel 272, which includes the fluid ejection die 204 molded therein, is released from the mold chase 252 and release liner 254. A fluid slot 302 is formed through a portion of the molded panel 272, where the fluid slot 302 corresponds to the fluid slot feature 256 of the mold chase 252. As shown, the fluid slot 302 exposes the protective layer 232 that covers the fluid feed holes 216. In block 310, the protective layer 232 has been removed such that the fluid slot 302 is fluidly connected to the fluid feed holes. In some examples, removing the protective layer may comprise wet dipping in protective layer material remover. For example, if the protective layer material is HT10.10, the molded panel may be wet dipped in WaferBond remover from Brewer Science, Inc. At block 320, the carrier 206 is detached from the molded panel 272 and fluid ejection die 204 molded in the molded panel 272.

Figure 5:
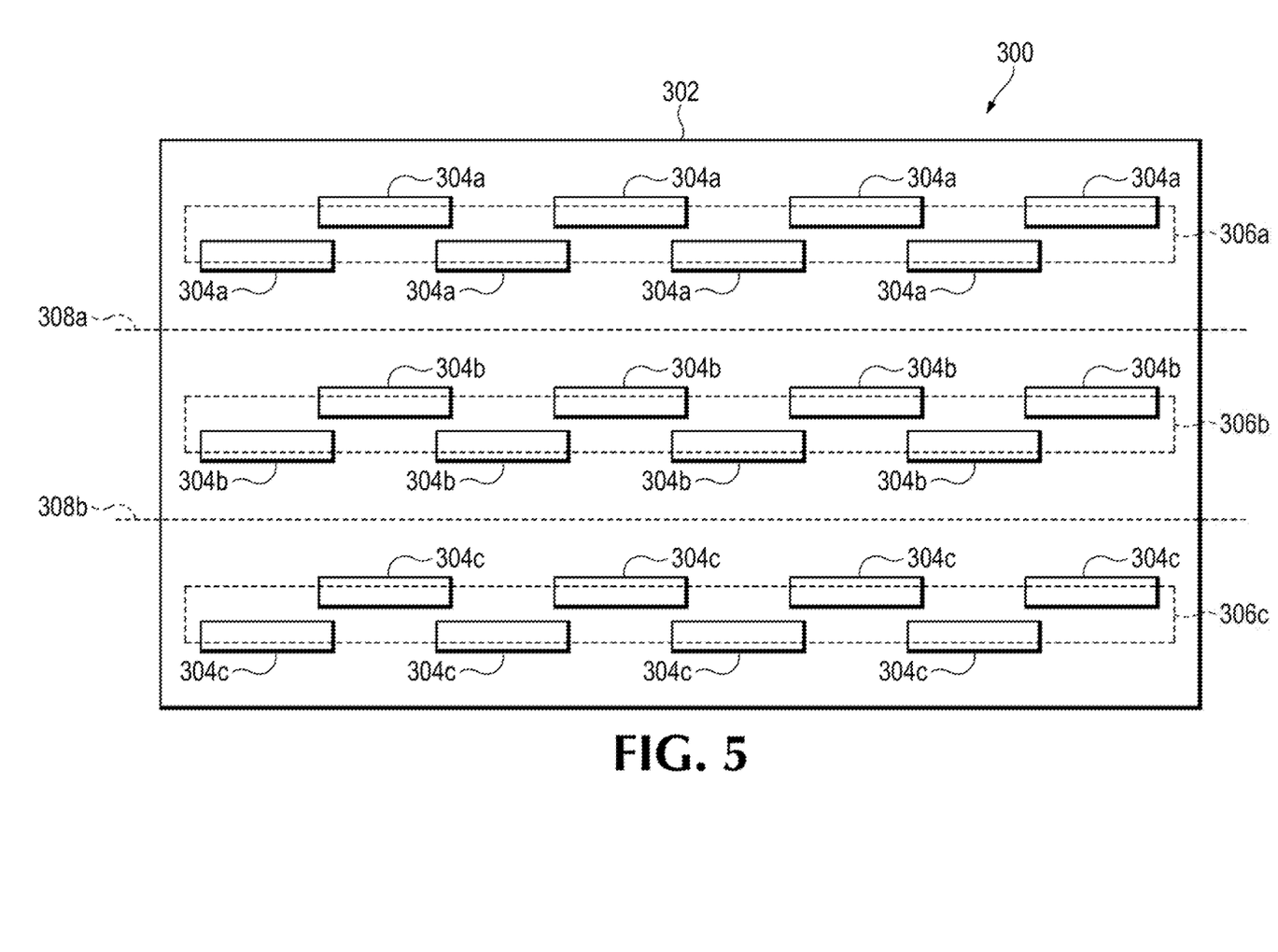
FIG. 5 is a block diagram that illustrates some example components of example devices formed by example processes.

FIG. 5 is a top view of an example fluid ejection device 300. In this example, the fluid ejection device 300 comprises a molded panel 302 and a plurality of fluid ejection dies 304a-c molded in the molded panel 302. As shown, the fluid ejection dies 304a-c are generally arranged end-to-end along a width of the molded panel 302. In this example, a respective fluid slot 306a-c is illustrated in dashed line for each row of fluid ejection dies 304a-c. In such examples, the molded panel 302 including the fluid ejection dies 304a-c may be formed in a manner described herein. Furthermore, in some examples, the molded panel 302 may be singulated into fluid ejection devices that comprise a respective row of fluid ejection dies 304a-c along singulation lines 308a-b. In other examples, all the fluid ejection dies may be implemented in a single fluid ejection device 300 in which each row of fluid ejection dies 306a-c is to eject a different fluid. In some examples, the fluid ejection device 300 may be implemented in a page-wide, fixed printhead, printing device.

While the example of fluid ejection device 100 is illustrated with three sets of fluid ejection dies 104a-c, other examples may comprise various arrangements of fluid ejection dies based on the fluid ejection systems and processes into which the examples may be implemented.

Accordingly, examples provided herein may provide devices including a molded panel having fluid ejection dies molded therein. In addition, the molded panel be formed with a mold chase and a release liner disposed on an interior surface of the mold chase. Furthermore, the mold chase may have a fluid slot feature that forms a fluid slot in a molded panel formed thereby.

The preceding description has been presented to illustrate and describe examples of the principles described. This description is not intended to be exhaustive or to limit these principles to any precise form disclosed. Many modifications and variations are possible in light of the description. Therefore, the foregoing examples provided in the figures and described herein should not be construed as limiting of the scope of the disclosure, which is defined in the Claims.

The invention claimed is:

1. A process comprising:
arranging a fluid ejection die on a carrier;
forming a molded panel that includes the fluid ejection die at least partially embedded in the molded panel with a mold chase that includes a fluid slot feature aligned with fluid feed holes of the fluid ejection die, the mold chase further including a release liner on an interior surface of the mold chase; and
releasing the mold chase and release liner from the molded panel such that the molded panel comprises a fluid slot formed therethrough corresponding to the fluid slot feature of the mold chase, the fluid slot fluidly connected to the fluid, feed holes of the fluid ejection die.

2. The process of claim 1, further comprising:
prior to forming the molded panel, distributing a protective layer on the fluid ejection die that covers the fluid feed holes of the fluid ejection die; and
after releasing the mold chase and release liner from the molded panel, removing the protective layer to thereby fluidly connect the fluid slot and the fluid feed holes of the fluid ejection die.

3. The process of claim 2, wherein forming the molded panel that includes the fluid ejection die with a mold chase that includes a fluid slot feature aligned with fluid feed holes of the fluid ejection die comprises:
engaging the protective layer distributed on the fluid ejection die with a surface of the mold chase corresponding to the fluid slot feature.

4. The process of claim 2, wherein a height of the protective layer distributed on the fluid ejection die is within a range of approximately 1 micrometers to approximately 20 micrometers.

5. The process of claim 1, further comprising:
after releasing the mold chase and release liner, releasing the molded panel including the fluid ejection die at least partially embedded therein from the carrier.

6. A process comprising:
arranging a plurality of fluid ejection dies on, a carrier, each respective fluid ejection die having a protective layer disposed on a back surface thereof over fluid feed holes thereof;
forming a molded panel that includes the plurality of fluid ejection dies with a mold chase and release liner coupled to the mold chase, the release liner covering an interior surface of the mold chase, the mold chase having a respective fluid slot formation feature for each respective fluid ejection die of the plurality of fluid ejection dies that is aligned with the fluid feed holes of the respective fluid ejection die;

releasing the mold chase and release liner from the molded panel such that the molded panel has a respective fluid slot formed therethrough that corresponds to each respective fluid slot feature of the mold chase and is aligned with the fluid feed holes of the respective fluid ejection die; and removing the protective layer disposed on each respective fluid ejection die to thereby fluidly connect the fluid feed holes of each respective fluid ejection die to the respective fluid slot formed through the molded panel.

7. The process of claim 6, wherein forming the molded panel comprises:

engaging the protective layer of each respective fluid ejection die with a surface of the respective fluid slot formation feature to thereby deform the protective layer and form a protective seal over the fluid feed holes of each respective fluid ejection die.

8. The process of claim 6, wherein forming the molded panel comprises:

compression molding or transfer molding a mold material in the mold chase.

9. The process of claim 6, further comprising:

releasing the molded panel including the plurality of fluid ejection dies from the carrier.

10. The process of claim 9, further comprising:

singulating the molded panel to thereby form fluid ejection devices each comprising at least one fluid ejection die.

11. The process of claim 10, wherein each respective fluid ejection device comprises a set of the fluid ejection devices arranged generally end-to-end in a staggered formation along a width of the respective fluid ejection device.

\* \* \* \* \*